Oct. 26, 1948.  L. W. FALK ET AL  2,452,520
GEAR SHAVING MACHINE
Filed July 15, 1944  3 Sheets-Sheet 1

Louis W. Falk
George P. Maurer
Walter P. Schmitter
INVENTORS:

BY Ralph W. Brown
ATTORNEY.

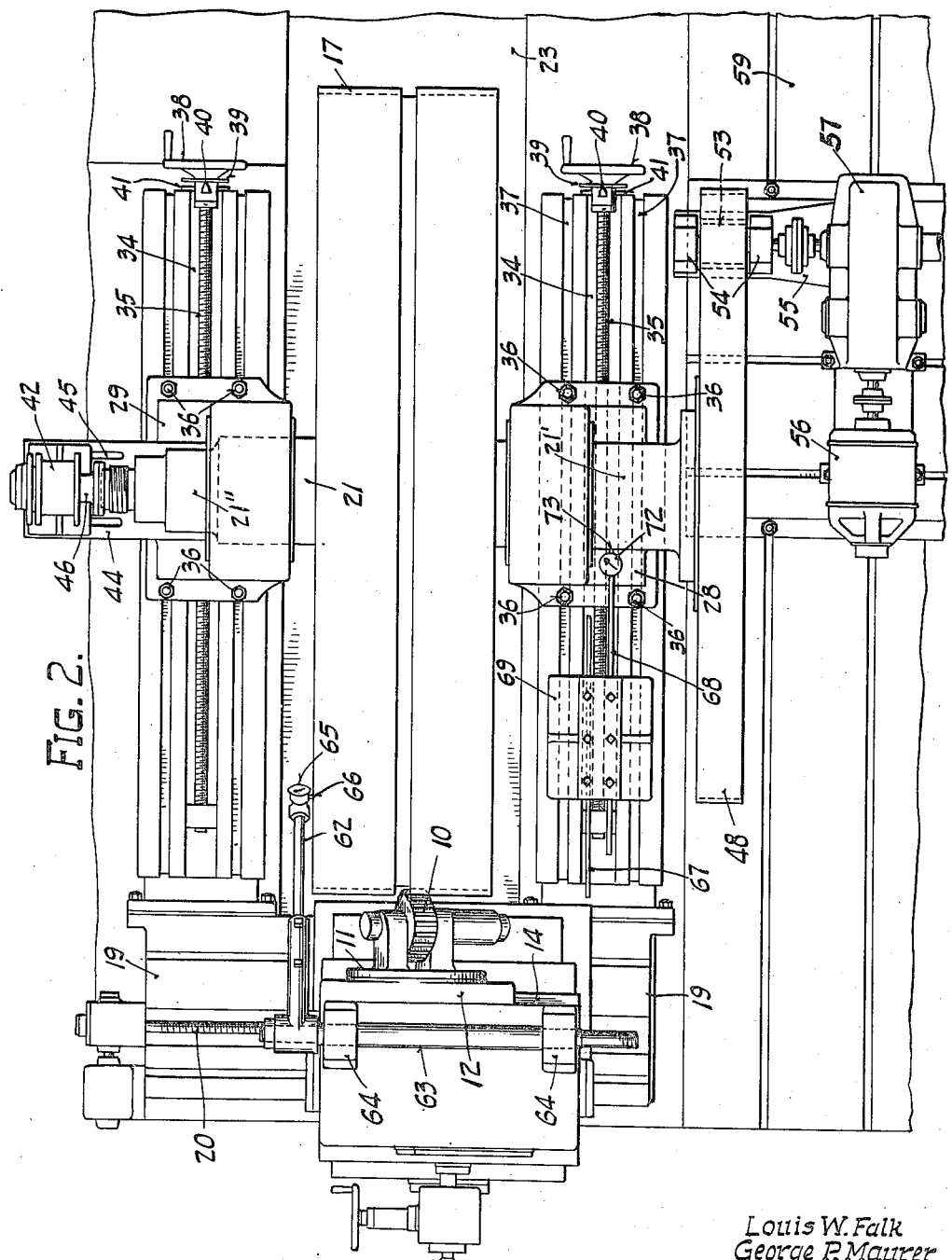

Oct. 26, 1948.    L. W. FALK ET AL    2,452,520
GEAR SHAVING MACHINE
Filed July 15, 1944    3 Sheets-Sheet 3
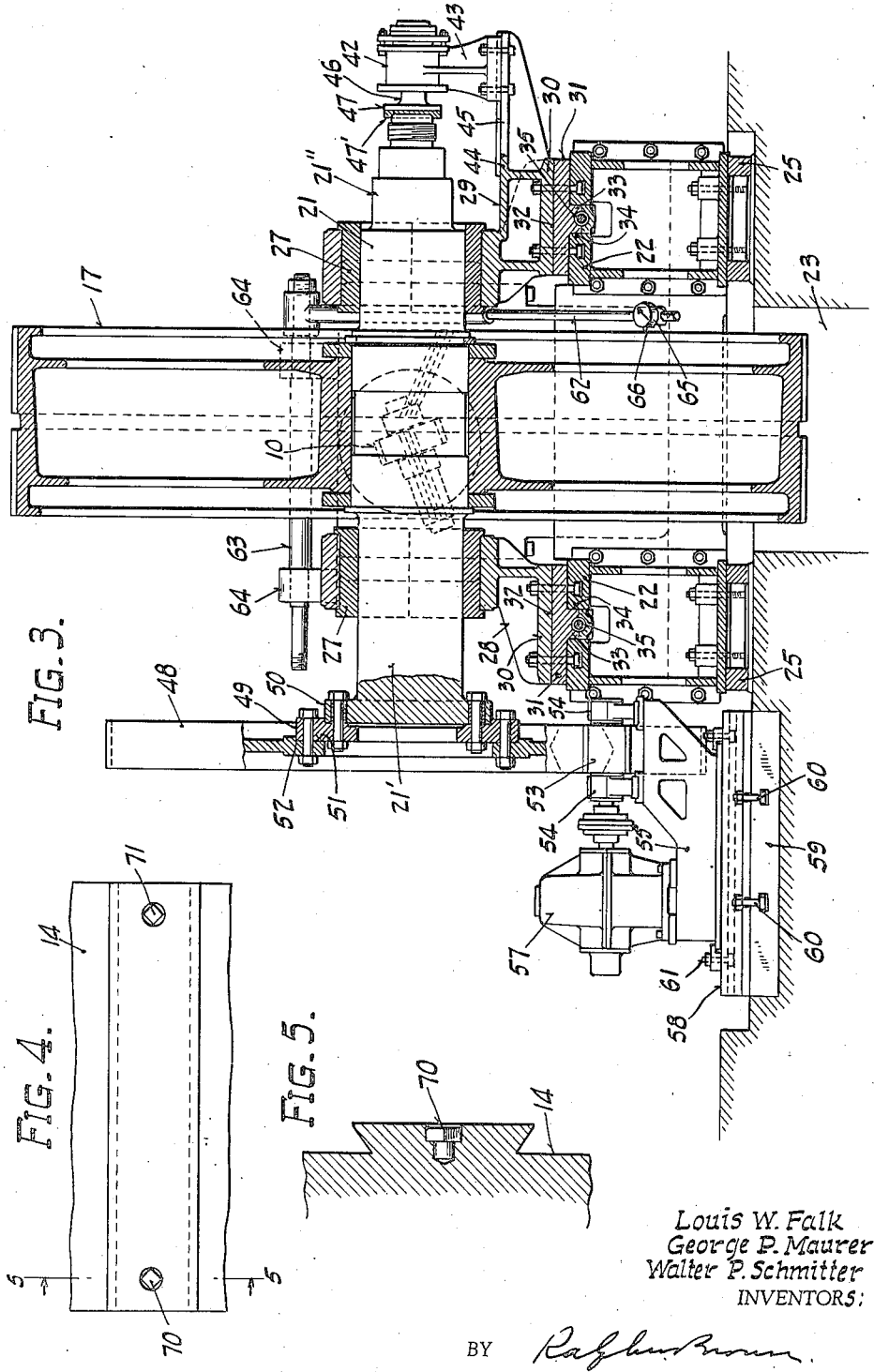
Louis W. Falk
George P. Maurer
Walter P. Schmitter
INVENTORS:
BY *Ralph* *Brown*
ATTORNEY.

Patented Oct. 26, 1948

2,452,520

UNITED STATES PATENT OFFICE 2,452,520

GEAR SHAVING MACHINE

Louis W. Falk, Milwaukee, and Walter P. Schmitter and George P. Maurer, Wauwatosa, Wis., assignors to The Falk Corporation, Milwaukee, Wis., a corporation of Wisconsin Application July 15, 1944, Serial No. 545,108

4 Claims. (Cl. 90—1.6)

This invention relates to gear shaving machines.

Gear shavers are strictly precision machines employed primarily for the purpose of correcting or removing minute surface inaccuracies that commonly develop during the process of cutting or generating gear teeth. Machines for this purpose involve the use of a rotary cutter of gear-like form adapted to mesh with the gear to be shaved and having teeth gashed or serrated to provide on each tooth flank a series of substantially parallel cutting edges each extending from the top toward the root of a tooth.

During the shaving operation the intermeshing cutter and work gear rotate about their respective axes which are inclined relative to each other. Either the cutter or work gear is positively driven and imparts rotation to the other; one is intermittently fed toward the other to develop the desired cutting pressure; and one is slowly reciprocated in a direction to shift the zone of action back and forth across the face of the work gear.

Gear shaving machines have been extensively used in the finishing of small gears and pinions but as heretofore designed such machines are incapable of shaving the larger types of gears such as marine gears. This is due in part not only to the increased dimensions, but also to the increased weight of such gears and to the serious problems encountered in the mounting and control of such gears with the accuracy required for satisfactory shaving.

An object of the present invention is to provide shaving machines for the accurate finishing of large gears.

Other more specific objects and advantages will appear, expressed or implied, from the following description of a gear shaving machine constructed in accordance with the present invention.

In the accompanying drawings—

Fig. 2 is a plan view thereof.

Fig. 3 is a transverse sectional view.

Fig. 4 is a face view of the guide for the tool slide shown in Figs. 1 and 2.

Fig. 5 is a sectional view taken along the line 5—5 of Fig. 4.

Figure 1:
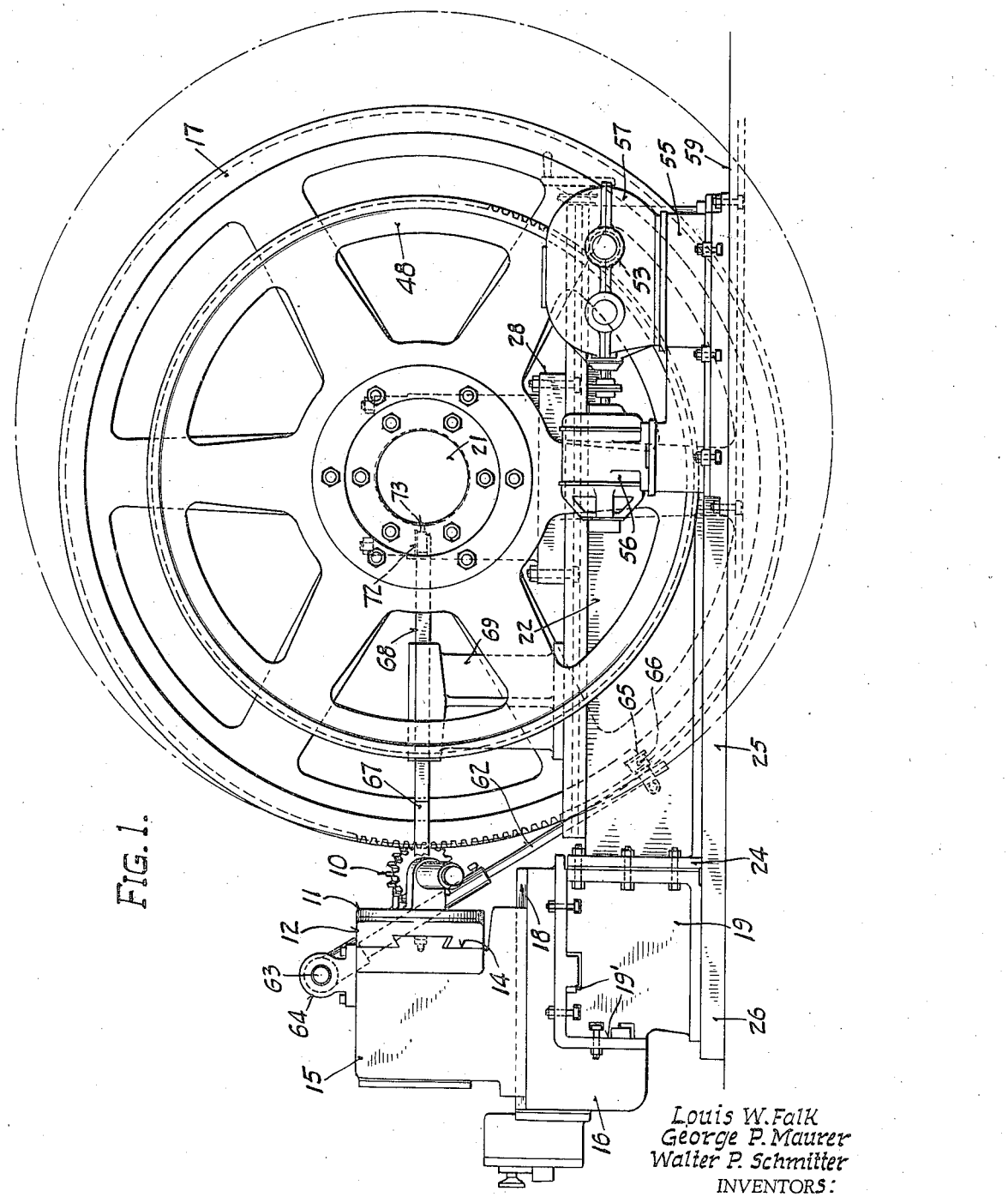
Figure 1 is a side elevational view of a gear shaving machine embodying the present invention.

The shaving machine selected for illustration comprises a conventional gear-shaped cutter 10 rotatably mounted in a turret 11 carried by an appropriate tool slide 12. The slide 12 is guided for horizontal reciprocation along the vertical face of a way 14 formed upon the adjustable head 15 of a carrier 16. The turret 11 is rotatably adjustable about a horizontal axis disposed normal to the face of the way 14 and extending through the center of the cutter 10. The axis of rotation of the cutter 10 lies in a vertical plane parallel to the face of the way 14 and may be set at any desired inclination by rotative adjustment of the turret 11.

The head 15 is movable toward and from the work gear 17 and for that purpose is mounted upon an appropriate horizontal way 18 provided on the carrier 16, the head 15 being actuated and controlled by suitable feed mechanism (not shown) by which the cutter 10 may be advanced and retracted into and out of meshing relation with the work gear 17 and by which the required cutting pressures may be established therebetween.

The carrier 16 is mounted upon a horizontally extended base 19 equipped with ways 19' that extend parallel to the way 14 and along which the carrier may be adjusted to position the cutter 10 within a range best suited for operation on the work gear 17. A motor driven feed screw 20 is shown for effecting this adjustment.

The shaving machine thus far described, including the cutter 10, is old and well known in the art, it being understood that during a shaving operation the carrier 16 remains stationary, the cutter 10 is fed against the work gear 17 by the advance of the head 15 along the way 18, the cutter 10 traverses the face of the work gear by reciprocation of the slide 12 along the way 14, and rotation is imparted to the cutter 10 from the rotating work gear.

The work gear 17 however is mounted, positioned, and driven in a novel manner preferably by means which will now be described capable of accommodating gears ranging in size from four to eighteen feet in diameter.

The work gear, selected for illustration, and the mounting shaft 21 to which it is fixed comprise a typical marine gear unit of moderate size. The gear is mounted to rotate about a horizontal axis and is shown supported by and between a pair of laterally spaced, horizontal, parallel base rails 22 of rigid box section design, disposed at opposite sides of a pit 23 into which the gear projects. The rails 22 are bolted or otherwise securely anchored at their rear ends 24 to the shaver base 19 and extend forwardly therefrom. The rails 22 are seated upon and anchored by bolts or otherwise to the parallel legs 25 of a U-shaped bed plate 26 which also provides support and anchorage for the shaver base 19, the rails 22 and base 19 being thus effectively joined to form a unitary structure of high rigidity.

In this instance the shaft 21 of the work gear is journalled in bearings 27 disposed at opposite sides of the gear 17 and separately supported in rigid pedestal structures 28 and 29 each mounted on one of the rails 22. The pedestals 28 and 29 are detachable from the rails 22 and readily replaceable by others so as to accommodate work gears and shafts of various sizes and types, and they are also adjustable lengthwise of the rails 22 for the same reason. For these purposes each pedestal 28 and 29 has an integral base plate 30 seated on a shoe 31 which in turn is slidably seated on the accurately machined top face 32 of its supporting rail 22, each shoe 31 having a depending rib 33 closely guided in a slot 34 formed in the rail. In this instance each rib 33 is fashioned to receive a feed screw 35 journalled in and extending lengthwise of the rail and operable to shift the shoe 31, and consequently the supported pedestal, to any desired position along the rail. Appropriate means, such as anchor bolts 36 extending through each base plate 30 and shoe 32 and engaged in T-slots 37 in the supporting rail, serve to releasably secure each pedestal in adjusted position.

The feed screws 35 are preferably separately operable by hand wheels 38 or the like, each carrying an appropriate indicator dial 39 for co-operation with a fixed pointer 40 carried by a support 41 in which the adjacent end of the screw 35 is journalled. It will of course be understood that by manipulation of the feed screws 35 work gears of various sizes may be radially adjusted into proper meshing relation with the cutter 10.

The work gear 17 is axially fixed by means readily adaptable to gears and shafts of various sizes and types. In this instance an end thrust bearing 42 adjustably mounted upon the bearing pedestal 29 is employed for this purpose. The end thrust bearing 42 is of a well known type. It is shown provided with a pedestal support 43 seated upon and bolted to a bracket plate 44 that projects horizontally from the pedestal 29. The plate 44 is slotted as at 45 in a manner to permit horizontal adjustment of the bearing pedestal 43 in a direction parallel to the axis of the gear 17.

A rotary stub shaft 46 axially fixed in the end thrust bearing 42 projects therefrom and is equipped with an end flange 47 by which it may be releasably coupled to the shaft 21 of the work gear through a suitable adapter 47'. In this instance the adapter 47' is in the form of a disk bolted or otherwise attached to the end of shaft 21 and similarly atached to the flange 47 of the stub shaft.

During the shaving operation the work gear 17 is driven preferably by a large indexing gear 48 rigidly attached to and carried by the shaft 21 thereof. The gear 48 is preferably of a diameter approaching that of the work gear 17 so as to effect a positive and accurate control of its rotation, rotation at uniform velocity being highly important for the accurate shaving of large gears.

In this instance the indexing gear 48 is attached to the shaft 21 through an adapter ring 49 which is bolted to the gear 48 and to the coupling flange 50 constituting a conventional part of the shaft 21. The adapter ring 49 is shown seated against the circular face 51 of the gear 48 which is machined to provide an encircling shoulder 52 that coacts with the adapter to accurately center the same with respect to the gear 48, and the adapter 49 is similarly machined and shouldered to provide a seat for the shaft flange 50 and to accurately center the adapter with respect thereto.

The indexing gear 48 is driven by a pinion 53 engaged therewith preferably at a low point and adjustably mounted to accommodate indexing gears 48 of various sizes and in the various positions that such gears may assume when applied to work gears of various sizes and types. The pinion 53 is shown journaled in spaced bearing supports 54 carried by a base 55 which also provides support for an electric motor 56 and connected speed reducer 57 through which the pinion is driven. In this instance the base 55 is seated upon a carrier plate 58 which in turn is seated upon a bed plate 59 that extends parallel to the adjacent base rail 22. The carrier plate 58 is adjustable lengthwise of the bed plate 59 and is adjustably fixed thereto by bolts 60, while the base 55 is adjustable on the carrier plate 58 in a direction transversely of the bed plate 59, suitable clamp lugs 61 being provided to releasably fix the base to the carrier plate. The base 55 is thus adjustable both lengthwise and transversely of the bed plate 59, so that the pinion 53 carried thereby is readily adjustable in any direction necessary to effect a meshing relation between it and the indexing gear 48 regardless of the size or position of that gear.

It is essential to the satisfactory shaving of gears that the axis of the work gear 17 be truly parallel to the axis of reciprocation of the cutter 10 or, in other words, that both of those axes lie in the same plane and that both be equidistant throughout their lengths. This positional relation is particularly important in the shaving of wide-faced gears and pinions and very difficult of attainment when large gears are involved. In the machine shown provision is made for checking the positional relation between those axes as an aid and guide in attaining the required parallelism therebetween.

For the purpose of ascertaining whether the axis of the work gear 17 is strictly coplanar with the axis of reciprocation of the cutter 10, a suitable gear scanning device is provided on the head 15 of the shaver. The scanning device shown comprises an arm 62 detachably fixed to one end of a rock shaft 63 journalled in appropriate bearing brackets 64 permanently fixed to the head 15. The shaft 63 is arranged so that its axis is parallel to the axis of reciprocation of the cutter and so that the arm 62 is swingable therewith in a plane normal to that axis. An indicator gauge 65 of a well known type is attached to the end of the arm 62 with its contactor 66 projecting laterally therefrom. The arm 62 is preferably adjustable as to length and thus adaptable for use with gears of various sizes. and may be transferred to the other end of the shaft to facilitate its use with gears of different types and in various positions.

By adjusting the shaver head 15 and its carrier 16 lengthwise of the base 19, the gauge contactor 66 may be brought into contact with the edge face of the rim of the gear 17 at a low point thereon, as indicated in Figs. 1 and 2. Then, without changing the position of the head 15, the arm 62 may be swung upwardly until the contactor engages or passes the same edge face of the rim at a high point, such as X thereon. If the contactor 66 contacts the rim face at point X and produces an indicator reading the same as that produced at the first or lower rim contact, then it would be known that the axis of the gear 17 is coplanar with the axis of the shaft 63 and consequently coplanar with the axis of reciprocation of the cutter 10. If the contactor 66 fails to contact the rim at the high point, however, or produces an indicator reading other than that produced at the first or lower contact point, then it would be known that the position of the gear is incorrect. Its position may be corrected by inserting one or more shims beneath one or the other of the bearing pedestals 28 or 29 until a position has been attained where the indicator 65 will show the same reading at both the upper and lower points of contact with the rim.

After the gear has been adjusted in the manner above described to position its axis in coplaner relation with the axis of reciprocation of the cutter, further adjustment is ordinarily necessary to insure that those axes are equidistant from each other at all points in the length thereof. As a means for checking this condition a pair of measuring rods 67 and 68 are provided. The rods 67 and 68 are in this instance mounted for lengthwise adjustment in an appropriate pedestal bracket 69 by which they are supported in a horizontal position disposed substantially at right angles to the shaft 21 and to the vertical face of the guideway 14 on which the tool slide 13 is mounted. The bracket 69 is shown seated on and releasably attached to one of the base rails 22, so that the rods 67 and 68 are positioned to measure the distance between one end portion 21' of the shaft 21 and the guideway 14; but the bracket 69 may be readily transferred to the other base rail 22 in which position the rods serve to measure the distance between the other end portion 21'' of the shaft and the guideway 14. Two plugs 70 and 71 having accurately ground and hardened faces are countersunk in the face of the guideway 14 to provide convenient reference points from which the above noted measurements are made. The projecting end of one of the rods 68 is preferably equipped with an indicator gauge 72 of a well known type having a contactor 73 positioned to contact the shaft 21.

With the rod supporting bracket 69 in the position shown, the shaver head 15 and its carrier 16 are adjusted along the base 19 to align one of the plugs 70 with the measuring rod 67. Thereafter, the rod 67 is extended through the bracket 69 until its free end contacts the face of the plug 70, and the rod 68 is similarly extended in the opposite direction until the indicator contactor 73 contacts the shaft end 21'. The distance between those points is thus definitely ascertained. The bracket 69, with the rods 67 and 68, is then transferred and attached to the other base rail 22, and the shaver head 15 and carrier 16 are adjusted along the base 19 to align the other plug 71 with the rod 67 in its new position. Both rods 67 and 68 are again adjusted in the manner above described to make contact with the plug 71 and shaft end portion 21'', respectively, to thereby measure the distance between those points. If the measured distances between the shaft ends 21' and 21'' and the plugs 70 and 71, respectively, do not agree, after correction is made for the difference in diameters of those ends, then either pedestal 28 or 29 may be adjusted along its base rail 22 until those measurements do agree, and in that position of the shaft true parallelism between the axis of the gear and the axis of reciprocation of the cutter is established.

Various changes may be made in the embodiment of the invention hereinabove specifically described without departing from or sacrificing the advantages of the invention as defined in the appended claims.

We claim:

1. In a gear shaving machine the combination of a gear-shaped shaving cutter, a pair of laterally spaced horizontal rails, means for receiving and journalling the shaft of a work gear to support the latter in meshing relation with said cutter, said means being adjustable lengthwise of said rails to accommodate work gears of different sizes, thrust sustaining means including a shaft detachably engageable with the shaft of the work gear to axially position the latter, a carrier for said cutter movable in a direction to cause said cutter to traverse the face of said work gear, and a support for said carrier movable to develop a shaving pressure between said cutter and work gear.

2. In a gear shaving machine the combination of a gear-shaped shaving cutter, a pair of laterally spaced horizontal rails, a pair of laterally spaced supports on said rails for receiving and journalling the shaft of a work gear to support the latter in meshing relation with said cutter, said supports being adjustable lengthwise of said rails to accommodate work gears of various sizes, thrust sustaining means carried by one of said supports and adjustable relative thereto to accommodate work-gear shafts of various lengths, said thrust sustaining means including a shaft detachably engaged with the shaft of the work gear to axially position the latter, a carrier for said cutter movable in a direction to cause said cutter to traverse the face of said work gear, and a support for said cutter movable in a direction to develop a shaving pressure between said cutter and work gear.

3. In a gear shaving machine the combination of a gear-shaped shaving cutter, a pair of laterally spaced horizontal rails, a pair of laterally spaced supports for receiving and journalling the shaft of a work gear to thereby support the latter in meshing engagement with said cutter, said supports being mounted on and adjustable lengthwise of said rails to accommodate work gears of various sizes, thrust sustaining means on one of said supports and including a shaft detachably engageable with the work-gear shaft to axially position the latter, means including a gear detachably engageable with the work-gear shaft for rotating the latter, a carrier for said cutter movable to cause said cutter to traverse the face of the work gear, and a support for said carrier movable to develop a shaving pressure between the cutter and work gear, said cutter being free to rotate in response to rotation of the work gear to distribute the shaving pressure between successive teeth of the work gear.

4. In a gear shaving machine the combination of a gear-shaped rotary shaving cutter, a pair of laterally spaced horizontal rails, means on said rails for receiving and journalling the shaft of a gear blank to support the latter between said rails and in meshing relation with said cutter, said means being adjustable lengthwise of said rails to accommodate gear blanks of different sizes, thrust means engageable with the shaft of the gear blank to axially position the same, a carrier for said cutter movable in a direction to cause said cutter to traverse the face of the gear blank, a support for said carrier movable to develop shaving pressure between said cutter and gear blank, and power driven means for rotating the gear blank, said cutter being engageable with and rotatively driven solely by the gear blank.

LOUIS W. FALK.
WALTER P. SCHMITTER.
GEORGE P. MAURER.

REFERENCES CITED

The following references are of record in the file of this patent:

UNITED STATES PATENTS

| Number | Name | Date |
|---|---|---|
| 2,214,225 | Drummond | Sept. 10, 1940 |
| 2,227,491 | Drummond | Jan. 7, 1941 |
| 2,245,654 | Drader et al. | June 17, 1941 |

FOREIGN PATENTS

| Number | Country | Date |
|---|---|---|
| 18,919 | France | May 1857 |
| 488,812 | France | July 26, 1918 |